US008123439B2

(12) United States Patent
Rouge et al.

(10) Patent No.: US 8,123,439 B2
(45) Date of Patent: Feb. 28, 2012

(54) SLOTTING MILLING CUTTER FOR MACHINING WITH A HIGH FEED AND A LOW PASS DEPTH

(75) Inventors: Gilles Rouge, Angerville (FR); Pascal Charles Emile Thoison, Mennecy (FR); Claude Roger Robert Turrini, Ballancourt (FR)

(73) Assignee: SNECMA, Paris (FR)

( * ) Notice: Subject to any disclaimer, the term of this patent is extended or adjusted under 35 U.S.C. 154(b) by 829 days.

(21) Appl. No.: 12/186,116

(22) Filed: Aug. 5, 2008

(65) Prior Publication Data
US 2009/0060663 A1 Mar. 5, 2009

(30) Foreign Application Priority Data

Aug. 30, 2007 (FR) ...................... 07 06073

(51) Int. Cl.
B23C 5/10 (2006.01)
B23C 5/14 (2006.01)
(52) U.S. Cl. ................ 407/54; 407/63; 407/42
(58) Field of Classification Search .............. 407/34, 407/35, 42, 43, 53, 54, 56, 57, 61–63
See application file for complete search history.

(56) References Cited

U.S. PATENT DOCUMENTS

| 5,725,338 | A | | 3/1998 | Cabaret et al. | |
|---|---|---|---|---|---|
| 5,779,399 | A | * | 7/1998 | Kuberski | 407/54 |
| 5,964,555 | A | * | 10/1999 | Strand | 409/234 |
| 6,846,135 | B2 | * | 1/2005 | Kuroda et al. | 407/53 |
| 6,976,815 | B2 | * | 12/2005 | Berglow et al. | 409/234 |
| 7,094,005 | B2 | * | 8/2006 | Svensson | 407/53 |
| 7,367,758 | B2 | | 5/2008 | Turrini et al. | |
| 7,402,004 | B2 | * | 7/2008 | Tanaka et al. | 407/53 |
| 7,927,046 | B2 | * | 4/2011 | Tanaka et al. | 407/53 |
| 7,997,834 | B2 | * | 8/2011 | Aoki et al. | 407/54 |
| 2008/0047333 | A1 | | 2/2008 | Turrini et al. | |
| 2010/0143052 | A1 | * | 6/2010 | Aoki et al. | 407/54 |

FOREIGN PATENT DOCUMENTS

| EP | 0 477 093 A1 | 3/1992 |
|---|---|---|
| EP | 1 348 508 A1 | 10/2003 |
| EP | 1 498 203 A2 | 1/2005 |
| WO | WO 2007/013447 A1 | 2/2007 |

OTHER PUBLICATIONS

U.S. Appl. No. 08/354,812, filed Dec. 8, 1994, Cabaret, et al.
U.S. Appl. No. 12/180,075, filed Jul. 25, 2008, Turrini.

* cited by examiner

Primary Examiner — Boyer D Ashley
Assistant Examiner — Sara Addisu
(74) Attorney, Agent, or Firm — Oblon, Spivak, McClelland, Maier & Neustadt, L.L.P.

(57) ABSTRACT

Slotting milling cutter, comprising a carbide body (12) and a ceramic head (16) fixed by brazing to one end of the body, this head having teeth (22), each comprising a cutting edge (24) formed by the intersection between a front cutting face ($A_\gamma$) and a lower flank face, in which the milling cutter has a frustoconical general shape, the profile of the flank face, formed by the intersection of the flank face with a plane passing through the axis of the milling cutter, has an outwardly convex rounded shape, and the radial cutting angle is negative.

20 Claims, 2 Drawing Sheets

SLOTTING MILLING CUTTER FOR MACHINING WITH A HIGH FEED AND A LOW PASS DEPTH

BACKGROUND OF THE INVENTION

The present invention relates to a milling cutter, in particular to a slotting milling cutter, for machining with a high feed and a low pass depth, this milling cutter being particularly, but not exclusively, suitable for machining parts made of very hard materials used in the aeronautical industry.

An aircraft turbomachine comprises, for example, many parts made of high-hardness materials such as composites and superalloys based on nickel and cobalt. The high-speed machining of these materials generates high thermal and mechanical stresses in the cutting tools, which therefore have to be made of materials that are very strong and resistant to high temperatures.

It is known to manufacture a slotting milling cutter from a block of a ceramic or carbide material. A ceramic milling cutter has a high hardness and a high thermal resistance, and makes it possible for high-speed machining and high rates of material removal to be achieved. However, it is expensive to produce and very brittle, so that it is in general reserved for the machining of soft materials, such as wood, and is therefore not used in the aeronautical industry. A carbide milling cutter is less expensive to manufacture and better able to withstand the mechanical stresses during machining. However, it is of lower performance and wears away more rapidly than a ceramic milling cutter.

DESCRIPTION OF THE PRIOR ART

It has already been proposed to form a milling cutter comprising a cylindrical first part made of a carbide, forming the milling cutter body, fixed to one end of which by brazing is a second cylindrical part made of a ceramic, forming the head of the milling cutter and having cutting edges. The brazed joint lies generally in a plane approximately perpendicular to the rotation axis of the milling cutter. This type of two-part milling cutter is very advantageous as it makes it possible to limit the use of the ceramic to just the milling cutter head and to choose a material which is tougher than the ceramic and less expensive for producing the body of the tool. Such a milling cutter is furthermore particularly suitable for the high-speed machining of superalloy or composite parts. Patent EP-B-0 477 093 of the Applicant describes a milling cutter of this type.

A two-part milling cutter of the aforementioned type nevertheless has a major drawback. During a machining operation, the torsional forces applied on the cutting tool generate large shear forces in the brazed joint that may weaken it and cause the milling cutting head to be detached and may damage the part to be machined.

The invention provides a simple, efficient and inexpensive solution to this problem.

SUMMARY OF THE INVENTION

The subject of the invention is a slotting milling cutter of the aforementioned type, the dimensions and the geometry of which are particularly suitable for reducing the shear forces to which the soldered joint connecting the body to the head of the milling cutter is subjected during a machining operation.

For this purpose, the invention provides a milling cutter, in particular a slotting milling cutter, which comprises a carbide body extending along the rotation axis of the milling cutter and a ceramic head fixed to one end of the body by brazing, this head having teeth regularly distributed around the axis of the milling cutter and separated from one another by chip pockets, each tooth having an approximately radial main cutting edge formed by the intersection between a front cutting face and a lower flank face, wherein:

the milling cutter has a frustoconical general shape, the large base of which is located on the head side, the milling cutter having a conicity between about 1° and 5°;

the profile of the flank face, formed by the intersection of the flank face with a plane passing through the axis of the milling cutter, has an outwardly convex rounded shape, the radius of curvature of which is between about 5 mm and 20 mm; and the cutting angle between the cutting face of each tooth and a reference plane passing through the rotation axis of the milling cutter and through a point in question on the main cutting edge of the tooth is negative and between about 2° and 8°, this angle being measured in a working plane perpendicular to the rotation axis of the milling cutter and passing through the point in question on the main cutting edge of the tooth.

Thanks to the combination of the geometric and dimensional characteristics of the milling cutter according to the invention, the cutting forces transmitted between the teeth and the part during machining result in low torsional forces in the milling cutter and in higher axial compressive forces to which the milling cutter is much less sensitive. The reduction in torsional forces in the milling cutter enables the shear forces in the brazed joint of the milling cutter to be reduced and therefore limits the risk of the head being torn off the body of the milling cutter.

The milling cutter according to the invention allows high-speed machining of parts made of very hard materials, such as for example an Inconel 718 wheel of a centrifugal turbomachine compressor. This milling cutter allows high cutting speeds and feeds to be achieved and increases the rate of material removal so as to reduce the time required to machine a part.

In the present application, the term "reference plane $P_r$" is understood to mean a plane passing through the rotation axis of the milling cutter and through a point in question on the main cutting edge of a tooth. A working plane $P_f$ is a plane perpendicular to the rotation axis of the milling cutter and passing through the point in question on the main cutting edge of the tooth. A rearward plane $P_p$ is a plane perpendicular to a reference plane and to a working plane at the point in question on the main cutting edge. An edge plane $P_s$ is a plane tangential to the main cutting edge at a point in question on this edge and perpendicular to the corresponding reference plane. A normal plane $P_n$ is a plane perpendicular to the main cutting edge at the point in question on this edge. The cutting face of a tooth is the surface along which the material chips slide and the flank face of this tooth is the surface along which the surfaces generated on the part run.

According to a first feature of the invention, the conicity of the milling cutter is determined so as to limit the rubbing between the external surface of the milling cutter and the side walls of the part during machining, this rubbing possibly causing thermal stresses in the milling cutter and the machined part which induce accelerated degradation of the milling cutter and deformation of the part. This conicity is also determined so as to ensure good removal of the material chips. For example, the milling cutter has a conicity of about 3°.

According to a second feature of the invention, the profile of the flank face, formed by the intersection of the flank face with a plane passing through the axis of the milling cutter, has an outwardly convex rounded shape, the radius of curvature of which is for example about 12 mm. The shape of this profile allows the torsional forces in the milling cutter to be limited and instead the axial compressive forces in the milling cutter to be promoted.

According to a third feature of the invention, the radial or lateral cutting angle $\gamma_f$, measured in the working plane perpendicular to the rotation axis of the milling cutter and passing through the point in question on the main edge, is negative so as to increase the robustness of the cutting edge and also to ensure good removal of the chips. This negative angle also makes it possible to have a compressive stress and not a tensile stress on the cutting edge when this edge approaches the end of the kerf and when the chip is ready to be detached from the part. The radial cutting angle $\gamma_f$ is for example about −5°.

Preferably, the milling cutter includes an approximately axial secondary cutting edge joined to the main cutting edge via a rounded nose of small radius of curvature, for example between 0.5 mm and 1 mm. The main and secondary cutting edges of a tooth between them define the cutting face of the tooth. The axial or rearward cutting angle $\gamma_p$ between the cutting face of each tooth and the reference plane is positive and between about 1° and 5°, this angle being measured in the rearward plane.

The milling cutter according to the invention therefore has a positive/negative geometry characterized by a positive axial cutting angle $\gamma_p$ and by a negative radial cutting angle $\gamma_f$. This type of milling cutter can withstand very high cutting forces greater than those of a milling cutter having a double positive geometry. This positive/negative geometry also allows high machining speeds with high feeds, since the negative radial cutting angle increases the resistance of the cutting edge, and the positive axial cutting angle makes it easier to form the chips, directing them on the opposite side from the head of the milling cutter.

Depending on the envisioned application, the milling cutter according to the invention may have from two to eight teeth. The milling cutter has for example an outside diameter D of between about 10 mm and 30 mm and the head of the milling cutter may have an axial dimension between about 5 mm and 10 mm.

The main cutting edge may be joined to the cutting face via a bevel for protecting the edge, this bevel having an axial dimension of between about 0.01 mm and 0.3 mm and making an angle of between about 10° and 30° with the cutting face.

According to yet other features of the milling cutter according to the invention:
the flank face extends circumferentially over a distance of between about 0.1 mm and 2 mm;
the flank angle between the flank face and an edge plane tangential to a point in question on the main cutting edge and perpendicular to the reference plane is positive and between about 5° and 10°, this angle being measured in a normal plane at the point in question on the edge. This flank angle $\alpha$ is for example about 7°;
a rake face extends rearwards from the flank face, the profile of the rake face, formed by the intersection of this face with a plane passing through the axis of the milling cutter, has an outwardly convex rounded shape whose radius of curvature is between about 5 mm and 20 mm. Preferably, the rake angle between the rake face and the aforementioned edge plane is positive and between about 10° and 20°;
the flank and rake faces are joined to a side wall of the tooth via rounded edges having radii of curvature of between about 0.5 mm and 1 mm. These rounded edges increase the strength of the milling cutter and ensure more uniform distribution both of the heat and the wear;
the teeth extend around a central annular cavity of the head, this cavity having a frustoconical general shape aligned with the axis of the milling cutter and the base of which is located on the lower end side of the milling cutter, the top of the cavity being a portion of a sphere, the radius of which is between about 2 mm and 8 mm. The opening angle of this cavity may be between about 90° and 150°, and is for example 120°. Preferably, the cavity is joined to the flank and rake faces of each tooth via a rounded edge having a radius of curvature of between about 0.5 mm and 1 mm. This cavity has for example a diameter of between about 5 mm and 15 mm and an axial height of between about 1 mm and 3 mm. The milling cutter having such a cavity is particularly suitable for oblique slotting (or ramping). In this case, the milling cutter is slightly inclined in the feed direction relative to a normal to the part to be machined, so as to prevent the milling cutter from resting flat against the part to be machined. This inclination $\delta$, which is between about 1° and 5°, and preferably between about 2° and 3°, has in particular the purpose of preventing the milling cutter from heeling, which would impair the surface finish of the machined part, leaving relatively deep marks thereon.

The invention also provides a method for the milling cutting of a composite or superalloy part by means of a slotting milling cutter of the type described above, which is noteworthy in that the cutting speed $v_c$ is between 200 and 1500 m/min, and preferably between 600 and 1000 m/min, the feed per tooth $f_z$ is between 0.1 and 1 mm/tooth, preferably between 0.2 and 0.5 mm, and the pass depth $a_p$ is between 0.01 and 2 mm, preferably between 0.1 and 1 mm. These ranges determine the optimum conditions under which it is recommended to use the milling cutter according to the invention without risk of accelerated wear or breakage of the milling cutter.

The cutting speed ($v_c$ in m/min) indicates the speed at which the cutting edge works the surface of the part. This speed determines the spindle speed of the milling cutter starting from the diameter D of the latter.

The feed per tooth ($f_z$ in mm/tooth) represents the linear distance traveled by the milling cutter between the penetration of two successive teeth into the part. The feed per revolution (f in mm/revolution) of the milling cutter is given by the feed per tooth multiplied by the number z of teeth of the milling cutter. The feed per revolution of a milling cutter indicates how much the tool advances during one rotation and is a value especially used to determine the feed of a milling cutter.

The axial cutting depth ($a_p$ in mm) in surface cutting milling corresponds to the thickness of material removed by the tool and to the distance at which the tool is set below the initial surface of the part.

BRIEF DESCRIPTION OF THE DRAWINGS

The invention will be better understood and other features, details and advantages of the invention will become apparent on reading the following description given by way of non-limiting example and with reference to the appended drawings in which.

DESCRIPTION OF THE PREFERRED EMBODIMENTS

FIGS. 1 to 5 show a slotting milling cutter 10 according to the invention for machining at high speed and with a low pass depth of parts made of high-hardness materials, such as aeronautical materials made of a composite or a superalloy (for example Inconel 718).

Figure 3:
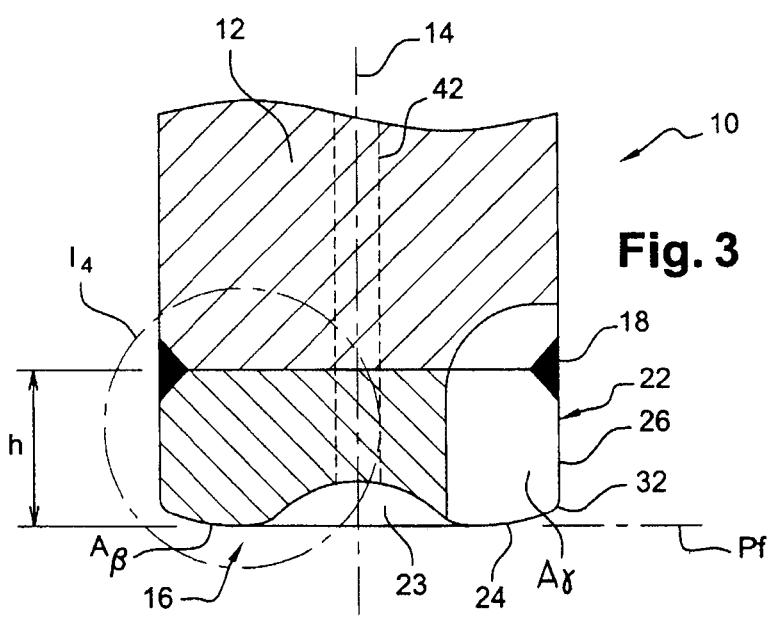
FIG. 3 is a sectional view on the line III-III of FIG. 1.

This milling cutter 10 has a carbide body 12 of elongate shape extending along the rotation axis 14 of the milling cutter and, fixed to a free end of this body by brazing, is a head 16 cut from a ceramic, forming the active part of the milling cutter. To give an example, the body 12 of the milling cutter is made of tungsten carbide and its head 16 is made of an alumina-based ceramic. The brazed joint 18 lies in a plane perpendicular to the rotation axis 14 of the milling cutter (FIG. 3). The body 12 of the milling cutter is intended to be fixed by suitable means to the mandrel of a machine tool.

Figure 4:
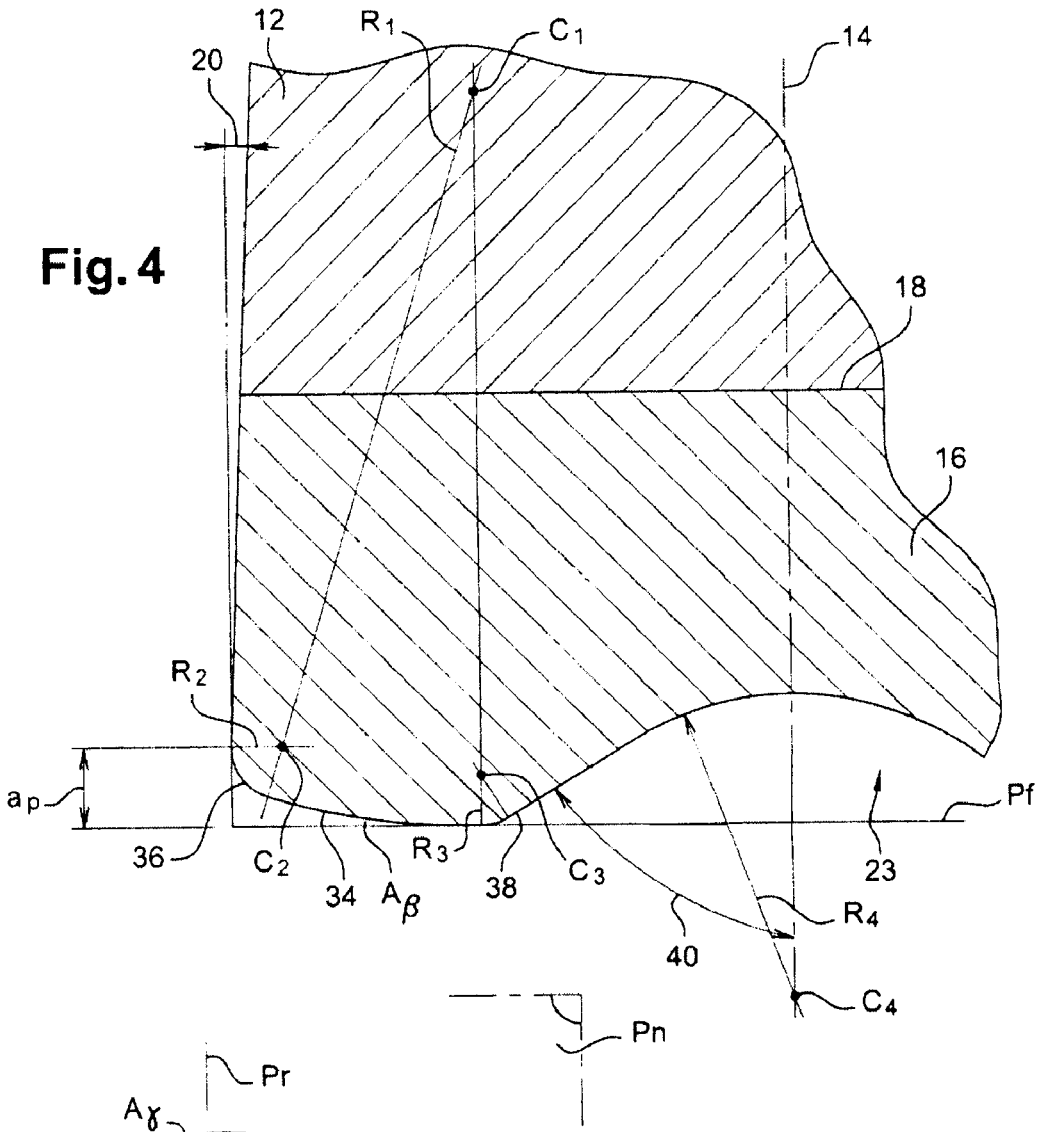
FIG. 4 is an enlarged view of the detail 14 indicated in FIG. 3.

The milling cutter 10 has a general shape of a truncated cone. The large base of the truncated cone is located level with the head 16 of the milling cutter and the conicity 20 of the milling cutter is between about 1° and 5°, preferably between about 2° and 4°, and is for example 3° (FIG. 4).

The head 16 of the milling cutter has an outside diameter D of between about 10 mm and 30 mm and has an axial height or dimension h of between about 5 mm and 10 mm. In the example shown, the head has a diameter D of 18 mm and a height of 7 mm.

The head 16 comprises three circumferentially oriented cutting teeth 22 uniformly distributed around the axis 14 of the milling cutter. These teeth 22 extend around a central cavity 23 of the milling cutter, which will be described in greater detail below with reference to FIG. 4.

Each tooth 22 has an approximately radial main cutting edge 24 and an approximately axial secondary cutting edge 26 which between them define a front cutting face $A_\gamma$. In the example shown, the cutting face $A_\gamma$ of each tooth extends over the entire height of the head 16 and over a lower end portion of the body 12 of the milling cutter, passing through the plane of the brazed joint 18 (FIG. 3).

The cutting face $A_\gamma$ forms a surface for the material chips to slide over and defines, with the rear end of an adjacent tooth, a chip pocket 28 in which the chips are temporarily stored before being ejected to the outside during a machining operation.

The cutting face $A_\gamma$ defines a leading angle of between about 80° and 100°, for example 87°, relative to the surface of a part to be machined.

The cutting face $A_\gamma$ is joined to the main cutting edge 24 via a bevel 30 (FIG. 5), which has an axial height 32 or dimension of between about 0.01 mm and 0.3 mm, for example 0.1 mm. The angle 34 between the bevel and the cutting face $A_\gamma$ is between about 10° and 30°, and is for example 20°.

The main and secondary cutting edges 24, 26 are joined together via a nose 32 of rounded shape, the radius of curvature of which is between about 0.5 mm and 1 mm, and is for example 0.8 mm (FIG. 3).

Figure 1:
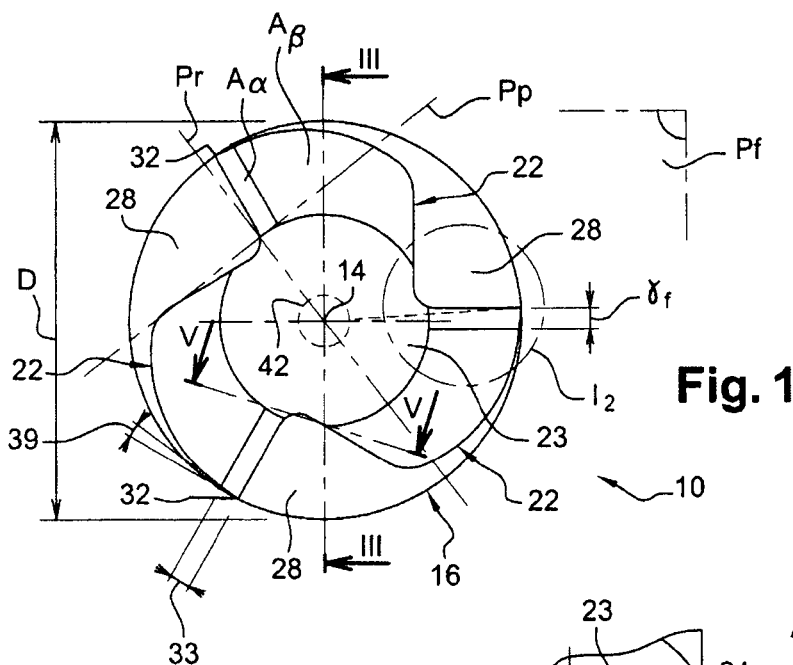
FIG. 1 is a schematic view from below of a slotting milling cutter according to the invention.
Figure 5:
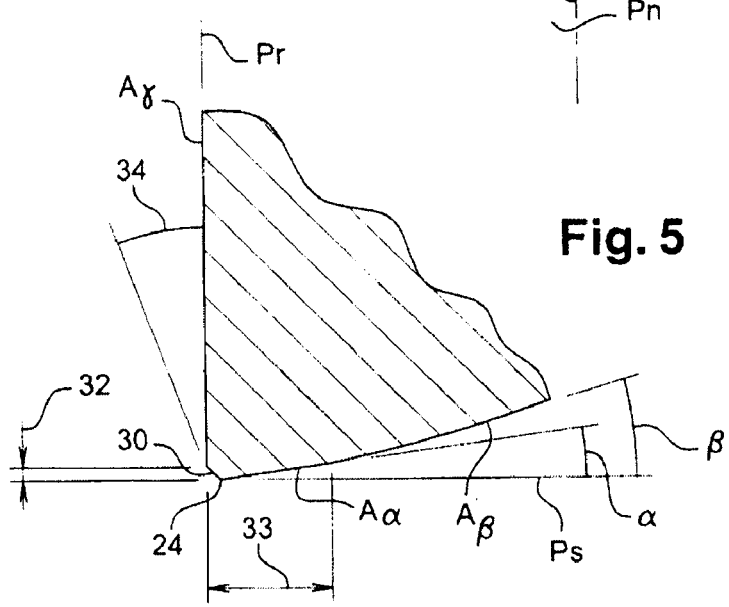
FIG. 5 is a sectional view on the line V-V of FIG. 1.

In the drawings, the following planes are defined:

$P_r$: reference plane of the milling cutter, passing through a point in question (for example the radially internal end) of the main cutting edge of a tooth 22 and through the rotation axis 14 of the milling cutter;

$P_f$: work plane of the milling cutter, perpendicular to the reference plane $P_r$ and passing through the point in question on the main cutting edge of the tooth 22 (this plane coincides with the plane of the drawing of FIG. 1);

$P_p$: rearward plane of the milling cutter, perpendicular to the reference plane $P_r$ and the work plane $P_f$ and passing through the point in question on the tooth;

$P_n$: plane normal to the edge, perpendicular to the main cutting edge 24, at a point in question on this edge (for example its radially internal end—the plane $P_n$ shown in FIG. 5 corresponds to the plane of section V-V of FIG. 1); and $P_s$: edge plane of the milling cutter, tangential to the point in question on the main cutting edge (its radially internal end) and perpendicular to the reference plane $P_r$.

The radial cutting angle $\gamma_f$ between the cutting face $A_\gamma$ of each tooth 22 and the reference plane $P_r$ is negative and between about 2° and 8°, preferably between 4° and 6°, and is for example 5°. This angle $\gamma_f$ is measured in the work plane $P_f$ (FIG. 2).

The axial cutting angle $\gamma_p$ between the cutting face $A_\gamma$ of each tooth 22 and the reference plane $P_r$ is positive and between about 1° and 5°, preferably between 2° and 4°, and is for example 3°. This angle $\gamma_p$ is measured in the rearward plane $P_p$.

The cutting face $A_\gamma$ is joined via the bevel 30 and the main cutting edge 24 to a lower flank face $A_\alpha$ which is extended rearward by a lower rake face $A_\beta$.

Figure 2:
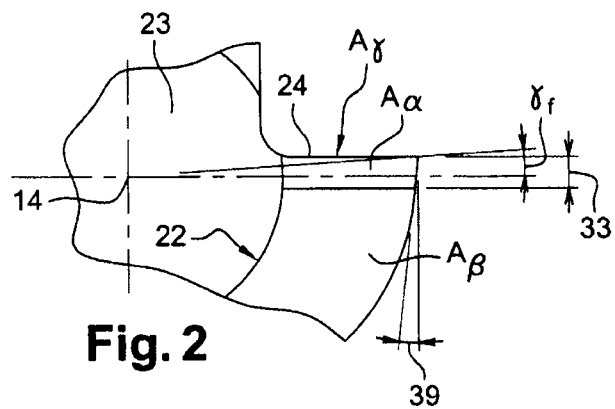
FIG. 2 is an enlarged view of the detail 12 indicated in FIG. 1.

The flank face $A_\alpha$ extends circumferentially over a length 33 of between about 0.1 mm and 2 mm, and preferably between about 0.5 mm and 1 mm (FIG. 2).

The flank angle $\alpha$ between the flank face $A_\alpha$ and the edge plane $P_s$ is positive and between about 5° and 10°, and is for example 7°. This angle is measured in the normal plane $P_n$ (FIG. 5).

The rake face $A_\beta$ extends from the flank face $A_\alpha$ as far as the rear end of the tooth 22, and the rake angle $\beta$ between the rake face $A_\beta$ and the edge plane $P_s$ is positive and between about 10° and 20°, and is for example 15°. This rake angle $\beta$ is also measured in the aforementioned normal plane $P_n$.

The profiles of the flank face $A_\alpha$ and of the rake face $A_\beta$, which are formed by the intersections of the flank and rake faces with the planes passing through the rotation axis 14 of the milling cutter, have an outwardly convex rounded shape, the radius of curvature $R_1$ of which is between about 5 mm and 20 mm, preferably between 10 mm and 15 mm, and is for example 12 mm.

FIG. 4 is an enlarged axial sectional view of the milling cutter, the section passing through the rake face $A_\beta$ of a tooth 22. The rounded profile 34 of this rake face $A_\beta$, and its radius of curvature $R_1$, may be seen in this figure.

The radially internal end of the profile 34 is located below the radially external end of this profile, that is to say the internal and external peripheral edges of each tooth 22, are offset axially with respect to each other, the internal peripheral edge of the tooth being located below the external peripheral edge of this tooth. The internal peripheral edges of the teeth therefore define the lower end of the milling cutter and are intended to come first into contact with the part to be machined during a milling cutting operation.

The rounded profile 34 of the rake face $A_\beta$ is joined at its radially external end to the side wall of the tooth via a rounded edge 36, the radius of curvature $R_2$ of which is between about 0.5 mm and 1 mm, and is for example 0.8 mm. The profile 34 of the face $A_\beta$ is joined at its radially internal end to the central cavity 23 of the milling cutter via a rounded edge 38, the radius of curvature $R_3$ of which is also between about 0.5 mm and 1 mm, and is for example 0.8 mm. These rounded edges extend over the entire circumference of the tooth, level with its flank $A_\alpha$ and rake $A_\beta$ faces, the radially external rounded edge 36 of the tooth being joined to the nose 32 of this tooth.

In the example shown, the rounded profile 34 extends in the plane of section over an angle of about 20-25° and its center is located in the body 12 of the milling cutter. The centers $C_2$ and $C_3$ of the rounded edges 36, 38 are located on radii of the profile 34. The edge 36 extends over an angle of about 70-80° and the edge 38 extends over an angle of about 30-40° in the aforementioned plane.

The side wall of each tooth 22 converges slightly inward from the front to the rear (FIG. 2) and deviates by an angle 39 of between 5° and 12°, for example 7°, from a plane tangential to the outer wall of the body of the milling cutter.

The central cavity 23 of the milling cutter has a frustoconical general shape that extends along the axis 14 of the milling cutter, the large base of the truncated cone being on the side of the head 16 and the opening angle 40 of the cone being between about 90° and 150°, preferably between 110° and 130°, and is for example 120°.

The top of the cavity 23 is shaped as a portion of a sphere, the center $C_4$ of which is located on the axis 14 of the milling cutter and the radius $R_4$ of which is between about 2 mm and 8 mm, preferably between 3 mm and 6 mm, and is for example 4.7 mm. The cavity 23 has an axial height or dimension of between about 1 mm and 3 mm and a diameter at its base of between about 5 mm and 15 mm.

The milling cutter 10 may include an axial duct 42 for supplying the head of the milling cutter with lubricant, this duct 42 being connected at its upper end to a lubricant reservoir and emerging at its lower end in the central cavity 23 of the milling cutter (FIGS. 1 and 3). As a variant, this duct 42 may be connected at its lower end to three channels, each emerging at a tooth 22 of the milling cutter.

The milling cutter 10 shown in the drawings makes it possible to machine slots in hard materials with a high cutting speed, a large feed and a low pass depth. In the example shown, the pass depth $a_p$ corresponds approximately to the axial dimension between the internal and external peripheral edges of the teeth of the milling cutter (FIG. 4). The ranges of values recommended for use of this milling cutter are the following:

cutting speed $v_c$ preferably between 600 and 1000 m/min;
feed per tooth $f_z$ preferably between 0.2 mm and 0.5 mm; and
pass depth $a_p$ between 0.1 mm and 1 mm.

The invention claimed is:

1. A milling cutter, in particular a slotting milling cutter, which comprises a carbide body extending along the rotation axis of the milling cutter and a ceramic head fixed to one end of the body by brazing, this head having teeth regularly distributed around the axis of the milling cutter and separated from one another by chip pockets, each tooth having an approximately radial main cutting edge formed by the intersection between a front cutting face and a lower flank face, wherein:

the milling cutter has a frustoconical general shape, the large base of which is located on the head side, the milling cutter having a conicity between about 1° and 5°;
the profile of the flank face, formed by the intersection of the flank face with a plane passing through the axis of the milling cutter, has an outwardly convex rounded shape, the radius of curvature of which is between about 5 mm and 20 mm; and
the radial cutting angle between the cutting face of each tooth and a reference plane passing through the rotation axis of the milling cutter and through a point in question on the main cutting edge of the tooth is negative and between about 2° and 8°, this angle being measured in a working plane perpendicular to the rotation axis of the milling cutter and passing through the point in question on the main cutting edge of the tooth.

2. The milling cutter as claimed in claim 1, which has a conicity of about 3°.

3. The milling cutter as claimed in claim 1 or 2, wherein the radial cutting angle is about −5°.

4. The milling cutter as claimed in one of claims 1 or 2, wherein the profile of the flank face has a radius of curvature of about 12 mm.

5. The milling cutter as claimed in one of claims 1 or 2, which includes an approximately axial secondary cutting edge joined to the main cutting edge via a nose, this nose having a convex rounded shape whose radius of curvature is between about 0.5 mm and 1 mm.

6. The milling cutter as claimed in one of claims 1 or 2, wherein the axial cutting angle between the cutting face of each tooth and the reference plane is positive and between about 1° and 5°, this angle being measured in a rearward plane perpendicular to the reference and working planes.

7. The milling cutter as claimed in one of claims 1 or 2, wherein the flank face of each tooth is joined to a side wall of the tooth via a rounded edge having a radius of curvature of between about 0.5 mm and 1 mm.

8. The milling cutter as claimed in one of claims 1 or 2, wherein the teeth extend around a central annular cavity of the head, this cavity having a frustoconical general shape aligned with the axis of the milling cutter and the base of which is located on the lower end side of the milling cutter, the top of the cavity being a portion of a sphere, the radius of which is between about 2 mm and 8 mm.

9. The milling cutter as claimed in claim 8, wherein the opening angle of the cavity is between about 90° and 150°, and is for example 120°.

10. The milling cutter as claimed in claim 9, wherein the cavity is joined to the flank face of each tooth via a rounded edge having a radius of curvature of between about 0.5 mm and 1 mm.

11. The milling cutter as claimed in claim 10, wherein the cavity has a diameter of between about 5 mm and 15 mm and an axial dimension of between about 1 mm and 3 mm.

12. The milling cutter as claimed in one of claims 1 or 2, which has from two to eight teeth.

13. The milling cutter as claimed in one of claims 1 or 2, wherein the flank face extends circumferentially over a distance of between about 0.1 mm and 2 mm.

14. The milling cutter as claimed in one of claims 1 or 2, wherein the flank angle between the flank face and an edge plane tangential to a point in question on the main cutting edge and perpendicular to the reference plane is positive and between about 5° and 10°, this angle being measured in a normal plane perpendicular to the main cutting edge at the point in question on this edge.

15. The milling cutter as claimed in one of claims 1 or 2, wherein a rake face extends rearwards from the flank face, the profile of the rake face, formed by the intersection of this face with a plane passing through the axis of the milling cutter, has an outwardly convex rounded shape whose radius of curvature is between about 5 mm and 20 mm.

16. The milling cutter as claimed in claim 15, wherein the rake angle between the rake face and an edge plane tangential to the main cutting edge, at a point in question on this edge, and perpendicular to the reference plane, is positive and between about 10° and 20°, this angle being measured in a normal plane perpendicular to the main cutting edge at the point in question on the edge.

17. The milling cutter as claimed in one of claims 1 or 2, which has an outside diameter of between about 10 mm and 30 mm, for example 18 mm.

18. The milling cutter as claimed in one of claims 1 or 2, wherein the main cutting edge is joined to the cutting face via a bevel, this bevel having an axial dimension of between about 0.01 mm and 0.3 mm and making an angle of between about 10° and 30° with the cutting face.

19. The milling cutter as claimed in one of claims 1 or 2, wherein the head has an axial dimension of between about 5 mm and 10 mm, for example 7 mm.

20. A method for the milling cutting of a composite or superalloy part by means of a milling cutter as claimed in one of claims 1 or 2, wherein the cutting speed of the milling cutter is between 200 and 1500 m/min, the feed per tooth is between 0.1 and 1 mm and the pass depth is between 0.01 and 2 mm.

* * * * *